United States Patent [19]

Carp

[11] 3,870,378

[45] Mar. 11, 1975

[54] ADAPTIVE BRAKING SYSTEM CONTROL WHEEL SELECTION BY COEFFICIENT COMPARISON

[75] Inventor: Ralph W. Carp, Newport News, Va.

[73] Assignee: The Bendix Corporation, Southfield, Mich.

[22] Filed: Aug. 27, 1973

[21] Appl. No.: 391,925

[52] U.S. Cl. ............................... 303/21 EB, 303/20
[51] Int. Cl. ............................................. B60t 8/08
[58] Field of Search ............... 188/181; 303/20, 21; 317/5; 324/161–162; 340/53, 262, 263, 62; 307/10 R

[56] References Cited
UNITED STATES PATENTS

| | | | |
|---|---|---|---|
| 2,606,492 | 9/1971 | Hayes | 303/21 EB |
| 3,756,663 | 9/1973 | Fink et al. | 303/21 BE |
| 3,767,270 | 10/1973 | Urban | 303/21 BE |
| 3,768,872 | 10/1973 | Urban et al. | 303/21 BE |

*Primary Examiner*—Trygve M. Blix
*Assistant Examiner*—Stephen G. Kunin
*Attorney, Agent, or Firm*—W. G. Christoforo; Bruce L. Lamb

[57] ABSTRACT

An adaptive braking system in which the speed of each wheel on an axle is independently sensed but the braking pressure of both axle wheels is controlled during adaptive braking by a single brake pressure modulator. The speed of each wheel is sensed by an individual wheel speed sensor which in turn feeds an individual control logic circuit for its respective wheel. A control logic circuit normally generates signals for attenuating and subsequently restoring brake pressure on the wheel whose wheel speed sensor is feeding it. In the present invention, the control logic circuits are connected to a brake pressure modulator through a gating circuit so that brake pressure on both wheels is attenuated only if both control logic circuits generate signals to attenuate brake pressure and brake pressure is subsequently restored only if both control logic circuits require that brake pressure be restored. The gating circuit also permits the wheel having the highest speed to control adaptive braking in case the ratio of the speed of the low speed wheel with respect to the speed of the high speed wheel drops below a predetermined level.

3 Claims, 3 Drawing Figures

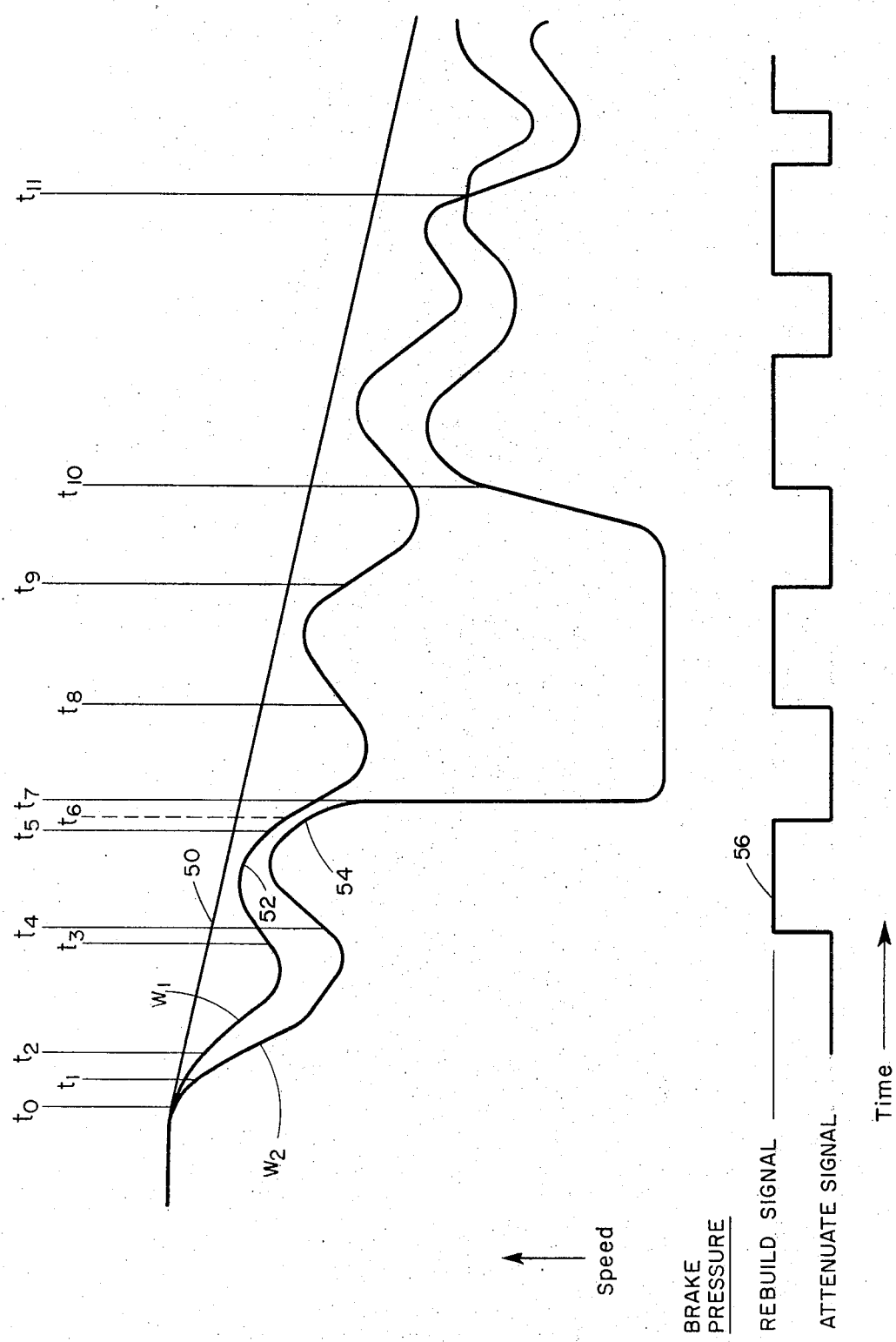

3,870,378

ADAPTIVE BRAKING SYSTEM CONTROL WHEEL SELECTION BY COEFFICIENT COMPARISON

BACKGROUND OF THE INVENTION

This invention relates to adaptive braking systems for wheeled vehicles, also referred to as anti-lock systems. The invention particularly relates to adaptive braking systems of the type wherein the performance of at least two wheels is individually sensed but collectively controlled by a single brake pressure modulator. In this latter type of adaptive braking system, normally two wheels on an axle are individually sensed and both wheels on the axle are collectively controlled by a single brake pressure modulator. Adaptive brake control on an axle basis is generally used in certain adaptive braking systems because of its cost advantage when compared to a system having individual wheel control.

The present invention performs a function somewhat similar to the function performed by an invention described in patent application Ser. No. 357,294, filed May 4, 1973 now U.S. Pat. No. 3,802,749, entitled "Adaptive Braking System Control Wheel Selection by Velocity Comparison" and assigned to the same assignee as this invention. However, the means of performing this function in the present invention differs from the means described in the aforementioned patent application.

The system designer to this time has had a choice of a number of different types of such axle control systems: select low wheel speed, select high wheel speed, select the average speeds of all wheels on the axle, and the system described in the aforementioned patent application. In that patent application, it was shown how performance information, specifically wheel speed information, of the wheel having the highest speed was used to determine when brake pressure or force should be reduced to both wheels while performance information from the wheel having the lowest speed was used to determine when brake pressure to both wheels should be subsequently increased. In the adaptive braking art, it is normally assumed that the low speed wheel is generally the wheel which has the poorest tire-road interface conditions with respect to braking ability. In other words, during braking the low speed wheel is usually running on a surface which is more slippery and has a lower coefficient of friction than the surface on which the high speed wheel is running.

An adaptive braking system which operates to prevent wheel lock by using a low speed wheel as the information source will provide the best stability since no wheel on the axle will lock during a stop. However, where the low speed wheel is used as the information source, the stopping distance of the vehicle will increase in those cases where the tire-road interface conditions of the various wheels are not uniform.

The selection of the high speed wheel as the information source provides the shortest stopping distance when the tire-road interface at the various wheels is not uniform. However, with this latter type of system one wheel can lock at any time with the result that vehicle lateral stability will be comprised.

Selecting the average speed of the various wheels, like the select high speed, permits one wheel to lock and has the additional disadvantage of effectively reducing the sensitivity of the adaptive braking system control logic to the wheel which is not locked. This reduction in sensitivity can result in deep slip cycles or the locking of all wheels.

SUMMARY OF THE INVENTION

An adaptive braking system will be described wherein the braking pressure of all wheels on an axle is controlled in response to the tire-road frictional coefficient at the various wheels. During adaptive braking, the wheel running on the higher coefficient surface and hence having the higher braking ability, is used to determine when the braking pressure should be reduced. Subsequently, information from the wheel running on the lower coefficient surface and hence having the lower braking ability is used to determine when brake pressure should begin to increase. This will normally insure that the low speed wheel, that is the wheel which is least efficient in braking the vehicle, will have increased significantly in speed before brake pressure is restored, thus eliminating or greatly reducing the tendency of the low speed wheel to go into lock-up.

If the tire-road surface interface is uniform at the various wheels, that is the braking ability of the various wheels is equal, stopping distance will be the same for all selection methods and lateral stability will be good. However, there is normally a moderate unbalance in the tire-road interface conditions in which case this new means of selecting the controlling wheel will provide shorter stopping distance than the select low method and will additionally reduce the tendency of the low speed wheel to lock.

It is known that when one wheel, during braking, locks or otherwise attains a speed which is very much less than the speed of another wheel, then it is likely that the locked or slow wheel is running on a very slippery surface and hence has very little braking capability. In this case, it is best to allow the slow wheel to lock and to control the adaptive braking using information received from the other wheel.

An object of this invention is to provide an adaptive braking system which is controlled in response to the relative braking ability of a plurality of wheels.

BRIEF DESCRIPTION OF THE DRAWINGS

FIG. 3 is a time graph which shows wheel speeds, vehicle speed and brake pressure control signals during a braked stop using an adaptive braking system which includes the present invention.

DESCRIPTION OF THE PREFERRED EMBODIMENT

Figure 1:
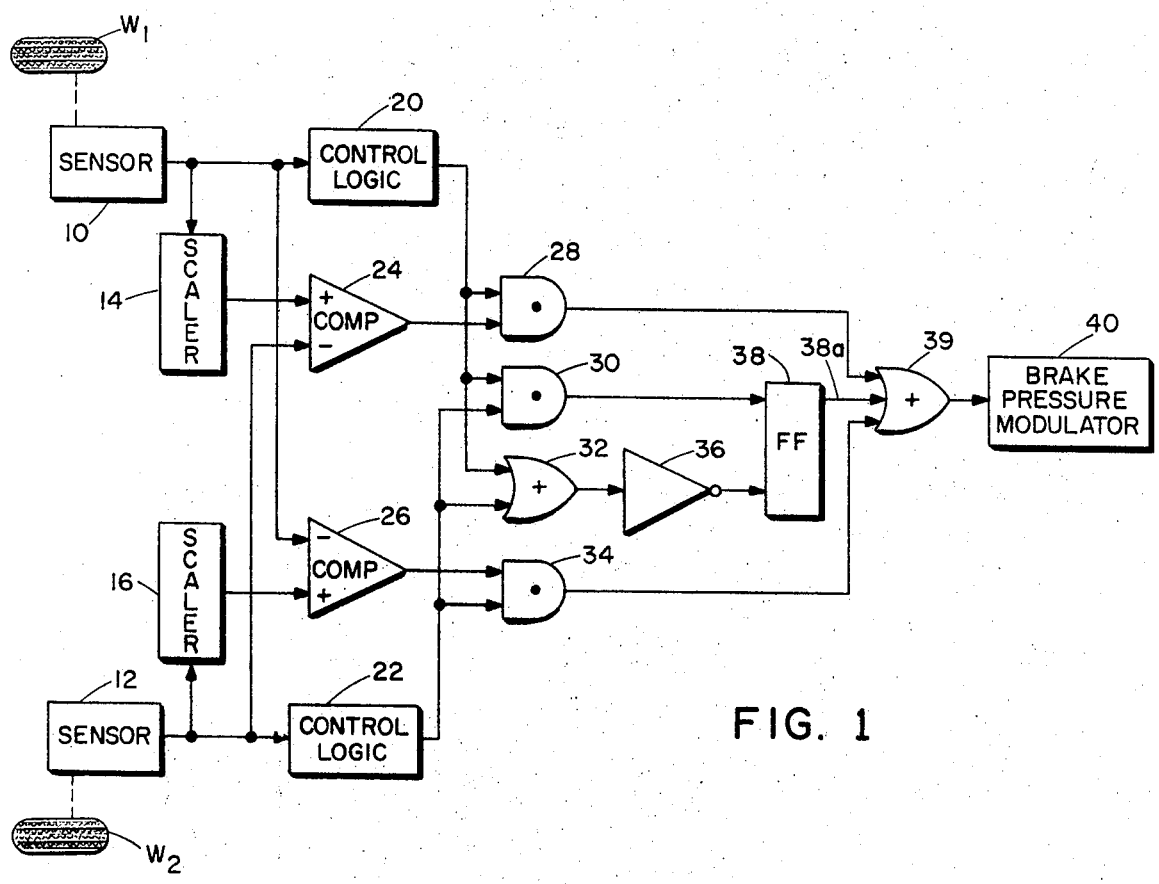
FIG. 1 is a block diagram of the invention.

Refer first to FIG. 1 where there are seen sensors 10 and 12. It is assumed in this embodiment that sensor 10 is ganged to one wheel (W1) on a particular axle while sensor 12 is ganged to another wheel (W2), suitably on the same axle. Each sensor generates an electrical output signal which is proportional to the performance, usually speed, of its associated wheel. As will be seen as this description proceeds, the signals generated by sensors 10 and 12 eventually operate to control a brake pressure modulator 40 during adaptive braking to thereby modulate the brake pressure or force at both sensed wheels, suitably simultaneously. For example, in a hydraulic fluid braking system, a single brake pressure modulator is used to control the brake fluid pressure at both axle wheels during adaptive braking. The signals from each sensor, which are normally d.c. voltage signals, are applied individually and respectively to control logic circuits 20 and 22. Control logic circuits of the type shown here are well known in this art and briefly, respond to a predetermined sequence of signals or change in signals applied thereto to generate a group of output signals which can be used to automatically control vehicle braking. For example, a control logic circuit might consider the speed of a sensed wheel and operate to generate an output signal which would normally attenuate braking pressure if the change in wheel speed indicates that the wheel has decelerated in excess of a predetermined reference and may subsequently operate to generate another signal which would normally restore braking pressure when the wheel speed signal indicates that the wheel has accelerated in excess of another predetermined reference. The exact form of control logic circuit is not a part of this invention, it only being necessary to mention that control logic circuit 20 operates in response to the signal from sensor 10 and that control logic circuit 22 operates in response to the signal from sensor 12 to generate signals which can be used to control braking pressure or force during an adaptive braking stop.

The output signals from sensors 10 and 12 are also applied respectively to scalers 14 and 16. A scaler, which can normally be a voltage divider if the sensor output signal is a d.c. voltage signal, generates an output which is a predetermined part of its signal input and represents a predetermined part of the wheel performance signal sensed by its associated sensor. Scaler 14 and 16 output signals respectively are applied to non-inverting input terminals of operational amplifiers 24 and 26, which are operated open looped as comparators. The output signals from sensors 10 and 12 are also applied respectively to the inverting input terminals of comparators 26 and 24.

The output signal of control logic circuit 20 is applied as an input to AND gates 28 and 30 and to OR gate 32, while the output signal from control logic circuit 22 is applied as inputs to AND gates 30 and 34 and also to OR gate 32. The output signal from AND gate 30 is applied to the set input terminal of flip-flop 38, while the output signal from OR gate 32 is applied through inverter 36 to the reset input terminal of the same flip-flop. The output signal from AND gate 28 is applied as an input to OR gate 39 as is the output signal from AND gate 34. The set output signal from flip-flop 38 is also applied as an input to OR gate 39 via line 38a. It is assumed in this embodiment of the invention that an output signal from OR gate 39 energizes brake pressure modulator 40 to attenuate braking pressure and that the subsequent disappearance of the output signal from OR gate 39 causes brake pressure modulator 40 to restore braking pressure. Brake pressure modulators which operate in this manner are well known in the art and need not be described in detail for a full understanding of the invention.

It is also assumed that compartor 24 generates an output signal when the signal from 14 is greater than the signal from sensor 12, that is, when the performance of the wheel sensed by sensor 12 falls below the performance represented by the output signal of scaler 14, that is, the predetermined part of the wheel performance sensed by sensor 10. In like manner, comparator 26 generates an output signal when the signal from scaler 16 exceeds the signal from sensor 10, that is, when the performance of the wheel sensed by sensor 10 is less than the predetermined percentage of the wheel performance sensed by sensor 12 as determined by scaler 16. It is further assumed that flip-flop 38 generates an output signal on line 38a when its set terminal receives a signal from AND gate 30 and that the signal at line 38a is extinguished when the reset input terminal receives a signal from inverter 36.

Figure 2:
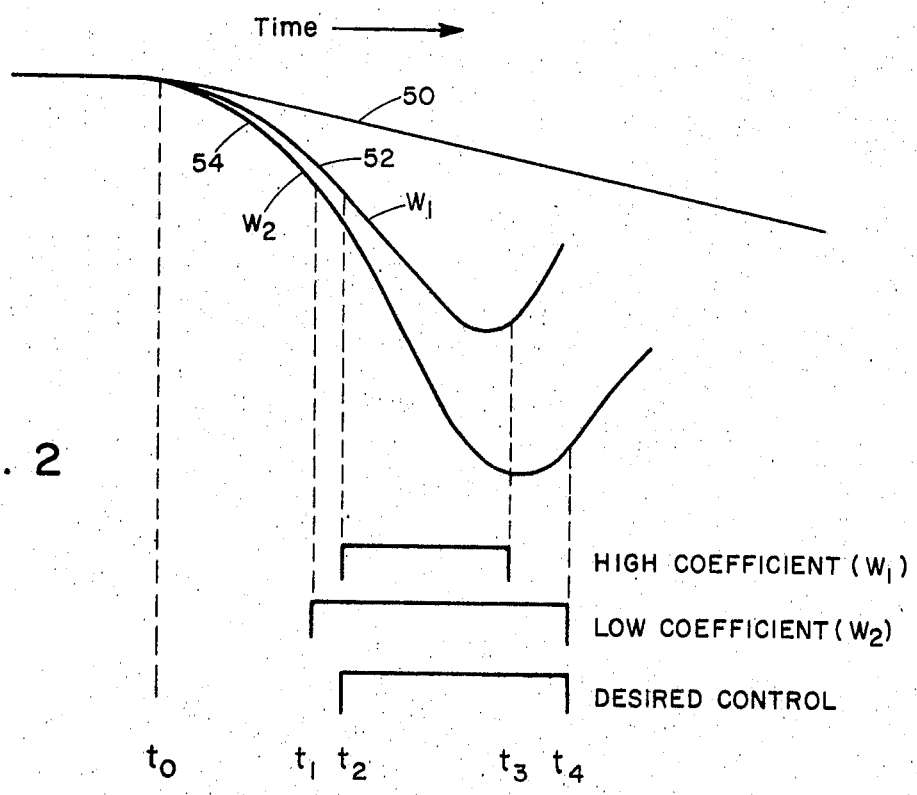
FIG. 2 is a time graph which illustrates the theory of the invention.

Refer now to FIG. 2 where various plots are shown on the same horizontal time scale, where curve 50 is a plot of vehicle performance, illustratively vehicle speed, versus time, curve 52 is a plot of the speed of one wheel on an axle, herein termed wheel one (W1), and curve 54 is a plot of the speed of the other axle wheel, herein termed wheel two (W2), during an illustrative vehicle braked stop, and wherein an adaptive braking system operates to automatically control vehicle braking. It is assumed that the vehicle brakes are applied at time $t_0$ so that prior to that time vehicle and wheel speeds are synchronous and their plots coincide. At time $t_0$, when brakes are applied, the wheels decelerate more rapidly than the vehicle and, in particular, wheel two (W2) decelerates more rapidly than wheel one (W1). If it is assumed that the brakes for wheel one and wheel two are generally identical to one another, the more rapid deceleration of wheel two indicates that that wheel is running on a relatively low coefficient surface. Assuming also, that the criteria for the control logic circuits 20 and 22 of FIG. 1 are identical and related to wheel deceleration, as would normally be the case, then the control logic circuit for wheel two will generate an output before the control logic circuit for wheel one. In the illustration of FIG. 2 the deceleration criteria for wheel two, which at that time is slower moving than wheel one, are assumed to be satisfied at time $t_1$ so that the control logic circuit 22, referring also to FIG. 1, generates a relatively high output signal. At time $t_2$ the deceleration criteria for wheel one are satisfied so that the control logic circuit 20 of FIG. 1 generates an output signal. As previously mentioned, it is desired that the wheel running on the relatively high coefficient surface control the attenuation of braking pressure during adaptive braking. Thus, it is desired that automatic braking control commence at time $t_2$. At that time, the circuit of FIG. 1 will operate to attenuate braking pressure as will be explained below.

In response to the attenuated braking pressure and since wheel one is running on a high coefficient surface, wheel one will speed up more rapidly than does wheel two. Thus, wheel one will satisfy the subsequent acceleration criteria for restoration of braking pressure before wheel two does. It is assumed that this acceleration criteria is satisfied for wheel one at time $t_3$ and for wheel two at time $t_4$. As also previously discussed, it is desired that the subsequent restoration of braking force be controlled by the wheel running on the lower coefficient surface, which is at time $t_4$. Examining FIG. 2 it can be seen that the desired control commences with the attenuation of braking pressure after the deceleration criteria for both wheels has been met and the subsequent restoration of braking pressure occurs after the acceleration criteria for both wheels has been met. This is accomplished simply, referring again to FIG. 1, by connecting the outputs from control logic circuit 20 and control logic circuit 22 through AND gate 30 so that the simultaneous occurrence of outputs from these control logic circuits will trigger flip-flop 38 into the set state to generate a signal on line 38a which passes through gate 39 to energize the brake pressure modulator 40 to attenuate braking pressure or force. To restore braking force, it is merely necessary to connect the output signals from the control logic circuits 20 and 22 through OR gate 32 and inverter 36 to the reset input terminal of flip-flop 38. Thus, upon the satisfaction of the subsequent acceleration criteria for both control logic circuits OR gate 32 will cease to generate an output which fact will be inverted by inverter 36 to thus trigger the reset input terminal of flip-flop 38 to thus extinguish the signal at line 38a.

Refer now to FIG. 3 where curves 50, 52 and 54 of FIG. 2 are carried on further in time and a curve 56 is also seen which indicates the times when the brake pressure attenuate and rebuild signals are generated. Of course, in this embodiment, the brake pressure attenuate signal is the signal generated by OR gate 39 of FIG. 1 which energizes brake pressure modulator 40 to attenuate brake pressure while the brake pressure rebuild signal is the signal generated by gate 39 which de-energizes brake pressure modulator 40 so that brake pressure is restored. As before, the brakes are applied at time $t_0$, prior to which time the vehicle and wheels are running synchronously and their plots coincide. At time $t_0$ the brakes are applied, and wheel two being assumed to be running on a lower coefficient surface decelerates more rapidly and the deceleration criteria of control logic circuit 22 are satisfied at time $t_1$. At time $t_2$ the control logic circuit 20 criteria are satisfied so that both control logic circuits are generating output signals which, as previously explained, causes the brake pressure attenuate signal to be generated to thereby begin release of the brake pressure on both wheels. As before, the subsequent acceleration criteria is met for wheel one at time $t_3$ and for wheel two at time $t_4$, at which time the brake pressure rebuild signal is generated. It is now assumed that subsequent to time $t_4$ but before time $t_5$ wheel two hits a relatively higher coefficient surface than wheel one and hence accelerates relatively more rapidly than wheel one as brake pressure is being restored and decelerates less rapidly once the wheel speed peak has been reached. Thus, the deceleration criteria for wheel one will be satisfied at time $t_5$ which is prior to time $t_6$, the time of which the wheel deceleration criteria of wheel two are satisfied. In this case, control logic circuit 20 of FIG. 1 will generate its output signal first and control logic circuit 22 will then generate its output signal so that the brake pressure modulator 40 will operate to attenuate braking pressure at time $t_6$. It is then assumed that at time $t_7$ wheel two hits an extremely slippery spot and before its braking pressure can be completely released, wheel two goes into a steep slip. It is also assumed the signal from sensor 12 decreases to a very low value so that the signal output from scaler 14 exceeds it and comparator 24 generates an output. In this state AND gate 28 is qualified so that the brake pressure modulator 40 is controlled solely by control logic circuit 20. Thus, at time $t_8$ when the acceleration criteria for wheel one are satisfied, the brake pressure rebuild signal will be generated and at time $t_9$ when the deceleration criteria for wheel one are satisfied the brake pressure attenuate signal will be generated. Somewhat after time $t_9$, it is assumed that wheel two comes off the very slippery spot and begins to increase in speed so that at time $t_{10}$ the signal from sensor 12 exceeds the signal from scaler 14 and comparator 24 no longer generates an output signal and gate 28 closes. With gate 28 closed, the output signal from control logic circuit 20 can no longer pass therethrough so that output signal from OR gate 39 is also extinguished. This, it will be remembered, is equivalent to the brake pressure rebuild signal, which signal it is seen is generated at time $t_{10}$. The operation of the system continues after time $t_{10}$ as previously described, except that at time $t_{11}$ it is assumed that wheel two becomes the faster wheel. Since the system of FIG. 1 is symmetrical with respect to sensors 10 and 12, the operation of the system will continue as before except that now wheel two is the faster wheel.

Although only a single embodiment of the invention has been shown, it should be understood that certain alterations and modifications will be obvious in light of these teachings to those skilled in the art. For example, although digital output signals are shown, it should be understood that in those adaptive braking systems wherein the control logic elements generate analog signals for controlling a brake pressure modulator, electronic switches can be used to switch the analog signals to the brake pressure modulator in the sequence taught by the present invention. Other alterations and modifications to the invention should also be obvious, thus the invention is to be limited only by the true scope and spirit of the appended claims.

The invention claimed is:

1. In a wheeled vehicle braked by braking force, an adaptive braking system having means for attenuating braking force in response to a first signal and for subsequently restoring braking force in response to a second signal comprising:

first means for generating a signal related to the speed of a first vehicle wheel;

second means for generating a signal related to the speed of a second vehicle wheel;

control logic means for generating a first group of third and fourth signals in response to the signal generated by said first means and for generating a second group of third and fourth signals in response to the signal generated by said second means;

means responsive to the simultaneous generation of third signals of said first and second groups of signals for generating said first signal and subsequently responsive to the simultaneous generation of said fourth signals of said first and second group of signals for generating said second signal;

comparator means for generating a comparator output signal when the speed of one of said first and second vehicle wheels is without a predetermined relationship with the speed of the other of said first and second vehicle wheels; and, means responsive to said comparator output signal for applying only the group of third and fourth signals, of said first and second group, generated in response to the signal related to the speed of the faster rotating of said first and second vehicle wheels, to said means for attenuating braking force, the group of third and fourth signals so applied to said means for attenuating braking force thereby comprising said first and second signals respectively.

2. The adaptive braking system of claim 1 wherein said first and second vehicle wheels are on the same vehicle axle.

3. The adaptive braking system of claim 1 wherein said second signal comprises the absence of said first signal.

* * * * *